United States Patent [19]

Betensky

[11] Patent Number: 5,499,140
[45] Date of Patent: Mar. 12, 1996

[54] WIDE ANGLE BINOCULAR SYSTEM WITH VARIABLE POWER CAPABILITY

[75] Inventor: Ellis I. Betensky, Redding, Conn.

[73] Assignee: BenOpcon, Inc., Cincinnati, Ohio

[21] Appl. No.: 336,413

[22] Filed: Nov. 9, 1994

Related U.S. Application Data

[62] Division of Ser. No. 28,413, Mar. 9, 1993, Pat. No. 5,371,626.

[51] Int. Cl.$^6$ .................................................. G02B 21/02
[52] U.S. Cl. ..................... 359/656; 359/661; 359/795; 359/407; 359/432
[58] Field of Search ............................ 359/656, 661, 359/684, 795, 894, 407, 432

[56] References Cited

U.S. PATENT DOCUMENTS

| | | | |
|---|---|---|---|
| 2,620,706 | 12/1952 | Levin | 359/783 |
| 3,088,368 | 5/1963 | Tripp et al. | 359/432 |
| 3,312,518 | 4/1967 | Bushnell | 359/407 |
| 3,418,032 | 12/1968 | Kajiro | 359/418 |
| 3,468,596 | 9/1969 | Alvarez | 359/557 |
| 3,918,791 | 11/1975 | Perry | 359/422 |
| 4,249,793 | 2/1981 | Uehara | 359/422 |
| 4,417,788 | 11/1983 | Alvarez et al. | 359/556 |
| 4,488,790 | 12/1984 | Beecher | 359/407 |
| 4,571,038 | 2/1986 | Jako | 359/376 |
| 4,650,297 | 3/1987 | Ishibai | 359/418 |
| 4,842,395 | 6/1989 | Sato et al. | 359/432 |
| 4,877,318 | 10/1989 | Miles et al. | 359/431 |
| 4,989,957 | 2/1991 | Suzuki . | |
| 5,028,125 | 7/1991 | Kikuchi | 359/422 |
| 5,074,650 | 12/1991 | Yamagishi et al. | 359/377 |
| 5,157,553 | 10/1992 | Phillips et al. | 359/407 |
| 5,191,470 | 3/1993 | Wickholm et al. | 359/407 |
| 5,311,355 | 5/1994 | Kato | 359/432 |

FOREIGN PATENT DOCUMENTS

| | | |
|---|---|---|
| 57-82811 | 5/1982 | Japan . |
| 2249406 | 5/1992 | United Kingdom . |

OTHER PUBLICATIONS

Dunn, J., "Improved binocular design gives users a wider view", *The Engineer*, May 21, 1992, 36.
Williamson, D., "The eye in optical systems", *SPIE Geometrical Optics*, vol. 531, 1985, 136–147.
Product brochure for Minolta binoculars, Minolta Camera Co., Ltd., Osaka, Japan, 1992.

*Primary Examiner*—Tan T. Nguyen
*Attorney, Agent, or Firm*—Maurice M. Klee

[57] ABSTRACT

Binoculars designed to provide a large aided static field of view are provided. The binoculars are characterized by S/D ratios of above 2.8, where S is the binoculars' aided static field of view calculated by multiplying the binoculars' magnifying power by the binoculars' semi field of view in object space and D is given by $\tan^{-1}[(R_{ex}+1.5)/13]$, where $R_{ex}$ is the radius of the binoculars' exit pupil and where $R_{ex}$ and the constants 1.5 and 13 are measured in millimeters. As a result of the increased S/D ratio, the binoculars of the invention minimize the sensation of tunnel vision which normally occurs when binoculars are used and reduce the user's apprehension of missing activities in his or her peripheral vision. In certain embodiments, a movable field lens unit is employed to provide variable power and a negative corrector lens unit is employed for aberration correction and to minimize the size of the binoculars. The binoculars are suitable for mass production and general consumer use.

2 Claims, 7 Drawing Sheets

WIDE ANGLE BINOCULAR SYSTEM WITH VARIABLE POWER CAPABILITY

This application is a divisional application of application Ser. No. 08/028,413 filed on Mar. 9, 1993 now U.S. Pat. No. 5,371,626.

FIELD OF THE INVENTION

This invention relates to viewing systems for use with the human eye such as monoculars and binoculars.

BACKGROUND OF THE INVENTION

1. Viewing Systems for Use with the Human Eye

A variety of viewing systems for use with the human eye are known. They fall into two categories: 1) those which are normally fixed during viewing with respect to the object such as telescopes and microscopes ("fixed systems"), and 2) those which are normally moved during viewing with respect to the object such as eyeglasses, loupes, monoculars, and binoculars ("movable systems"). The present invention relates to movable systems and, in particular, to monoculars and binoculars. To simplify the presentation, the following discussion uses the term "binoculars." As so used, the term is intended to include both binoculars and monoculars.

To understand the benefits of the invention it is necessary to understand how a person observes an event without binoculars, i.e., unaided by a viewing system. The first step, in general, involves noticing the movement of the image of an object on the retina in the low resolution, peripheral vision. The extent over which such movement can be observed is the eye's "unaided static field of view". Next, the eye is moved (scanned) to follow or observe the object in greater detail, i.e., at high resolution, by aligning the eye's fovea with the object. The extent over which the eye can move to follow the object is the eye's "unaided dynamic field of view". Finally, the head is moved so that the eye is as straight ahead as possible with respect to the head.

For the purposes of the following discussion, these two fields of view of the eye, i.e., the eye's unaided static and dynamic fields of view, need to be distinguished from the eye's "aided static field of view" and "aided dynamic field of view" which are the fields of view achieved for a static and scanning eye, respectively, with binoculars held at a fixed position relative to the eye. These aided fields of view are defined and discussed in more detail below. As also discussed below, it should be noted that the eye's aided static field of view is the same as what is commonly referred to as a binoculars' "field of view" when transformed to image space.

2. Binocular Technology

Historically, designers of binoculars have concentrated on maximizing the eye's higher resolution aided dynamic field of view at the expense of the eye's lower resolution aided static field of view. In particular, designers have assumed that the user rotates (scans) his or her eyes to follow an object and then after seeing the image start to disappear because the exit pupil of the binoculars is not coincident with the entrance pupil of the rotated eye, moves the binoculars thereby placing the two pupils in coincidence.

As a result, the image has been corrected over the entire "field of view" and a field stop has been used to delimit the "field of view" in order to ensure that the user has a corrected image throughout the eye's aided dynamic field of view. In order to provide a hand held instrument at reasonable cost, this has meant that the eye's aided static field of view has been limited, i.e., less than about 30° semi-field of view (SFOV) and in many cases less than about 20° SFOV.

Recently, various companies have offered "wide angle" binoculars. These binoculars are reported to have semi "fields of view" in object space which when transformed to image space, assuming f-θ distortion correction, correspond to semi "fields of view" in image space of around 33°. Although they represent some improvement over prior binoculars, as discussed below, these "wide angle" binoculars have still not satisfied the need for binoculars which truly deal with the fundamental difference between the eye's aided static and dynamic fields of view.

SUMMARY OF THE INVENTION

The present invention takes a completely different approach from the prior art. Specifically, rather than designing binoculars based only on the eye's aided dynamic field of view, the binoculars of the present invention are designed based on both the eye's aided dynamic field of view and its aided static field of view. More particularly, in accordance with the invention, it has been determined that the eye's aided dynamic field of view is not the critical field of view in terms of designing binoculars which can be moved relative to the object, i.e., in designing a movable system, supra. For binoculars, the user can readily, and prefers to, move the combination of his or her head and the binoculars to follow an object rather than trying to move the binoculars relative to the eyes. This approach is 1) easier since it does not upset the alignment of the binoculars with the eye, 2) does not require reaccommodation of the eye due to uncorrected field curvature, and 3) does not lead to erroneous changes in focus if reaccommodation is not sufficient.

By emphasizing the eye's aided static field of view, a user of the binoculars of the present invention can employ substantially more of his or her peripheral vision to detect a change in the object scene. Also, by this emphasis, the user has less of a sensation of tunnel vision. These effects make it much easier for people to use the binoculars of the invention over long periods of time which is clearly desirable.

Quantitatively, the enhancement of the aided static field of view relative to the aided dynamic field view is expressed herein in terms of the binoculars' "S/D" ratio. The definition and derivation of this ratio is shown in FIGS. 5 through 8.

FIG. 5 shows a human eye 15 aligned with the central axis of stylized binoculars 13. See also FIG. 7. The binoculars have an exit pupil 16 of radius $R_{ex}$, and the human eye has a center of rotation 19 and an entrance pupil 17 of radius $R_{ep}$, the radial distance between the center of rotation and the entrance pupil being R. $R_{ep}$ of course will vary with the amount of light impinging on the eye. For the purposes of the present invention, $R_{ep}$ is assumed to be approximately 1.5 mm, i.e., a typical daylight viewing pupil size. This value is chosen since the problems of tunnel vision are most pronounced in the daylight. Similarly, R will vary among individuals. For the purposes of the invention, R is assumed to have the typical value of around 13 mm.

As shown in FIG. 5, the aided static field of view is given by the angle S. As mentioned above, this angle corresponds to the binoculars' conventional "field of view" when transformed to image space.

FIG. 6 shows eye 15 rotated about its center of rotation 19 through an angle D so that the edge of the binocular' exit pupil and the edge of the eye's entrance pupil are coincident. See also FIG. 8. This position represents the eye's aided dynamic field of view when used with binoculars 13. Further rotation of the eye results in no image on the retina. In constructing FIG. 6, it has been assumed that the binoculars provide an aided static field of view which is greater than D, i.e., the binocular' stops and apertures are sufficient to allow light to reach the edge of the binocular' exit pupil at the angle D.

From the geometry of FIG. 6 and the values for $R_{ep}$ and R given above, i.e., 1.5 mm and 13 mm, respectively, D is approximately equal to the following expression in which $R_{ex}$ and the constants 1.5 and 13 are in millimeters:

$$D = \tan^{-1}[(R_{ex}+1.5)/13]. \quad (1)$$

Table 6 sets forth D values for exit pupil radii between 1.5 mm and 5.0 mm. A typical exit pupil radius for commercial binoculars is approximately 1.5 mm. Larger exit pupil radii are generally reserved for night vision devices because they result in larger entrance pupils which means heavier and more expensive binoculars. In view of these considerations, the most important parameter of the S/D ratio is the S value, and it is this value which has been ignored by prior workers in the art.

Thus, prior art binoculars, including the "wide angle" binoculars referred to above, because of their emphasis on the eye's aided dynamic field of view as opposed to its aided static field of view, have had S/D ratios below about 2.7 and in some cases as low as 1.3. The binoculars of the invention, on the other hand, have S/D ratios above 2.8, preferably above 2.9, and most preferably above 3.0. Prior to the present invention, binoculars with this level of emphasis on the eye's aided static field of view have not been proposed or available.

It should be noted that there is an upper limit to the S/D ratio. That limit occurs when the $R_{ex}$ is zero, e.g., in the case of a pinhole placed near the eye's pupil. D for such a case is approximately 6.6°. Since the maximum S for most people is 90°, the maximum S/D ratio is approximately 13.7.

In view of the foregoing, the invention in accordance with certain of its aspects provides binoculars for use with the human eye which comprise an objective lens unit (first means) for forming an intermediate image and an eye lens unit (second means) for forming a virtual image of the intermediate image for viewing by the eye, said virtual image presenting an aided static semi field of view to the eye of angular extent S, said binoculars having an exit pupil of radius $R_{ex}$ and providing an aided dynamic semi field of view to the eye of angular extent D given by the following in which $R_{ex}$ and the constants 1.5 and 13 are in millimeters:

$$D = \tan^{-1}[(R_{ex}+1.5)/13],$$

the ratio of S to D being at least 2.8.

The aided static semi field of view of the binoculars of the invention is preferably at least about 30 degrees and preferably comprises a central region and a peripheral region, the image resolving power in the central region being better than the image resolving power in the peripheral region. In this way, the virtual image produced by the binoculars more closely matches the eye's unaided static field of view. That is, the virtual image has a better image resolving power at the center than at the periphery, just as the eye's visual acuity is better at the center than at the periphery.

The image resolving power in the central region of the virtual image can, for example, be less than about 4 minutes of arc, with the image resolving power in the peripheral region being greater than about 4 minutes of arc, and the central region can comprise a semi field of view of at least about 5 degrees. It should be noted that as the minutes of arc value decreases, the resolving power increases, i.e., improves, and visa versa.

The central region of the virtual image should be at least about 5 degrees for the user to perceive that he or she has a good image of the object. To provide adequate peripheral vision, the aided static semi field of view of the binoculars should be at least about 30°. As discussed above, the image resolving power in the peripheral region can be relatively poor, e.g., greater than 4 minutes of arc, since this region corresponds to the user's peripheral vision where the eye's visual acuity is very low.

With binoculars of this type, the user can take advantage of a significantly larger portion of his or her peripheral vision than in prior art binoculars while at the same time having a good magnified image of a distant object at the central portion of his or her vision.

In certain embodiments of the invention, it is desirable to provide the binoculars with more than one magnification. This can be done in a variety of ways, the most preferred of which involves moving a positive lens unit (field lens unit) in the vicinity of the binocular' intermediate image. This aspect of the invention can be used independently of the other aspects of the invention, that is, it can be used with viewing systems generally.

In accordance with this aspect, the invention provides an optical system for magnifying an object comprising a positive first lens unit for forming an intermediate image of the object, a positive second lens unit in the vicinity of said intermediate image, a positive third lens unit for reimaging the intermediate image as modified by the positive second lens unit, and means for moving the positive second lens unit in the vicinity of the intermediate image to change the magnification of the object.

A further aspect of the invention involves the eyepiece of the binoculars. As the aided static field of view of the binoculars is increased, obtaining a large eye relief becomes difficult. Correcting off-axis aberrations requires the use of negative lens elements which further exacerbates the problem. In accordance with the invention, it has been found that these problems can be addressed by at least partially correcting off-axis aberrations with a negative lens unit placed ahead of the intermediate image. In this way, a large eye relief can be readily obtained.

An additional use of the negative lens unit involves its effects on the binocular' objective. Specifically, it allows the objective lens unit to have a shorter focal length which in turn allows the reverting and inverting means, e.g., an inversion prism, to be smaller. This effect can be seen by constructing a tunnel diagram for the reverting and inverting means.

In addition to these benefits, the negative lens unit also allows the overall length of the binoculars to be smaller.

As with the variable power aspect of the invention, the aspects of the invention relating to the use of a negative lens unit before the intermediate image can be used independently of the other aspects of the invention, that is, it can be used with viewing systems generally.

In accordance with this aspect of the invention, an eyepiece for viewing an intermediate image is provided which comprises a negative first lens unit positioned before the intermediate image and a positive second lens unit positioned after the intermediate image, said negative first lens unit providing aberration correction for the eyepiece and said positive second lens unit having only positive lens elements.

Alternatively, in accordance with this aspect of the invention, an objective for forming an intermediate image is provided which comprises in order a positive lens unit, means for reverting and inverting the intermediate image, and a negative lens unit before the intermediate image.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
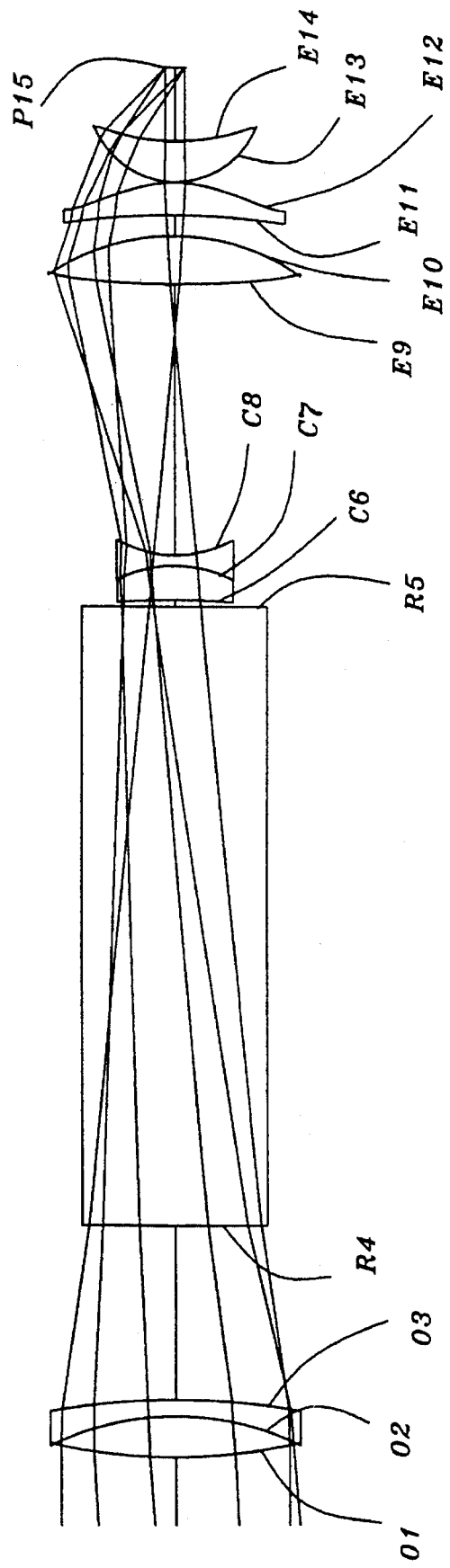
FIGS. 1 through 4 are schematic side views of lens systems constructed in accordance with the invention.

As discussed above, the present invention relates to binoculars having an objective lens unit and an eye lens unit. In each of the drawings, the lens elements of the objective lens unit are identified by "0" reference numbers, while those of the eye lens unit are identified by "E" reference numbers. The exit pupils of the various embodiments are identified by "P" reference numbers. To produce a reverted and erect image, the objective lens unit includes a reverting and inverting means identified by "R" reference numbers, which may be a Porro prism or a roof-type inversion prism.

Certain embodiments of the invention also include a corrector lens unit identified by "C" reference numbers and/or a field lens unit identified by "F" reference numbers. The eye lens unit and the corrector lens unit together form the system's eyepiece. The objective lens unit, the reverting and inverting means, and the corrector lens unit together form the system's Objective. That is, the corrector lens unit can be viewed as either part of the eyepiece or as part of the objective.

As discussed above, the field lens unit can be moved in the region of the intermediate image to change the magnification of the system. Such movement can be achieved using conventional techniques such as motors, cams, spring-loaded levers, or the like. It should be noted that a rapid change in magnification can be achieved in accordance with the invention since only a very small mass, i.e., the field lens, needs to be moved through only a relatively short distance.

The objective lens unit employs conventional lens elements known in the art for binoculars. Its aberrations are corrected in conjunction with the correction of the aberrations of the eye lens unit.

In the preferred embodiments of the invention, the eye lens unit is composed of only positive lens elements, although other types of eye lens units can be used if desired (see, for example, Examples 3 and 4).

The corrector lens unit is located between the reverting and inverting means and the eye lens units in front of the intermediate image. This unit has a negative power and in combination with the eye lens unit serves to correct off-axis aberrations while still allowing the overall optical system to have a large eye relief, e.g., an eye relief of at least 10 millimeters.

Aberration correction is also preferably provided by employing one or more aspherical surfaces in the lens system. Such aspherical surfaces are preferably employed in the eye lens unit where the manufacturing tolerances are least critical.

The field lens unit is located in the vicinity of the intermediate image. The unit has an overall positive power. When a corrector lens unit is used, the field lens unit will generally be located after that unit, i.e., closer to the eye lens unit. For single power systems, the field lens unit may be placed adjacent to the eye lens unit.

For variable power systems, the field lens unit may be moved from a position on the objective lens unit side of the intermediate image to a position on the eye lens unit side of the intermediate image, i.e., the field lens unit is moved through the intermediate image. Such movement results in an increase in the system's magnification. For example, as shown in Examples 2–4 below, the movement can increase the system's magnification from about 7 to about 12. In general, the field lens unit will have two positions corresponding to two magnifications with a common focus position, although if desired the unit can have multiple positions to provide a range of magnifications. In this latter case, the binoculars should include a compensator unit for changing the overall focus of the binoculars with movement of the field lens unit. It should be noted that the while the field lens unit is on the objective lens unit side of the intermediate image, the intermediate image moves and changes in magnification as the field lens unit is moved.

The increase in magnification caused by moving the field lens unit is associated with a reduction in the binocular' angular coverage in object space. Accordingly, the binoculars of the invention are preferably used primarily at low magnification where the angular coverage in object space is larger, with the higher magnification setting or settings being used when the user wishes to see a particular object in greater detail. It should be noted that the binocular' aided static field of view as presented to the eye remains constant even though the angular coverage in object space is changed.

The effect of moving the field lens unit through the intermediate image can be understood in terms of the basic equation for the magnification of a telescope, namely, that the magnification is the ratio of the objective focal length to the eyepiece focal length. When the field lens unit is on the objective lens unit side of the intermediate image, it can be considered part of the objective. As such, since it has a positive power, it makes the objective focal length shorter, corresponding to less magnification. When on the eye lens unit side of the intermediate image, the field lens unit can be considered part of the eyepiece. In this case, it makes the eyepiece focal length shorter, which corresponds to an increase in magnification. When located at the intermediate image, the field lens unit neither increases nor decreases the basic magnification of the system, i.e., in terms of the field lens unit the system is at +1.0 magnification.

To achieve the user benefits discussed above, the eye lens unit of the binoculars will in general have a relatively large diameter. This results in the advantage that the weight of the portion of the binoculars nearest the eye is increased. This, in turn, results in greater user positional stability. To further increase user stability the eye portion of the housing used to hold the lens elements can be designed so that the forefingers can rest on the ridges above the eye and the thumb can rest on the check bones. As an alternative, the reverting and inverting means can be selected so that the user holds the binoculars in a vertical position so that the arms are close to the body and thus stable. See, for example, Alvarez et al., U.S. Pat. No. 4,417,788.

In general, the benefits of the binoculars of the invention are best achieved when the user holds the binoculars in a fixed position relative to his or her eyes. Eyepiece cups or the like which will facilitate such fixed use are thus preferred.

Figure 2:
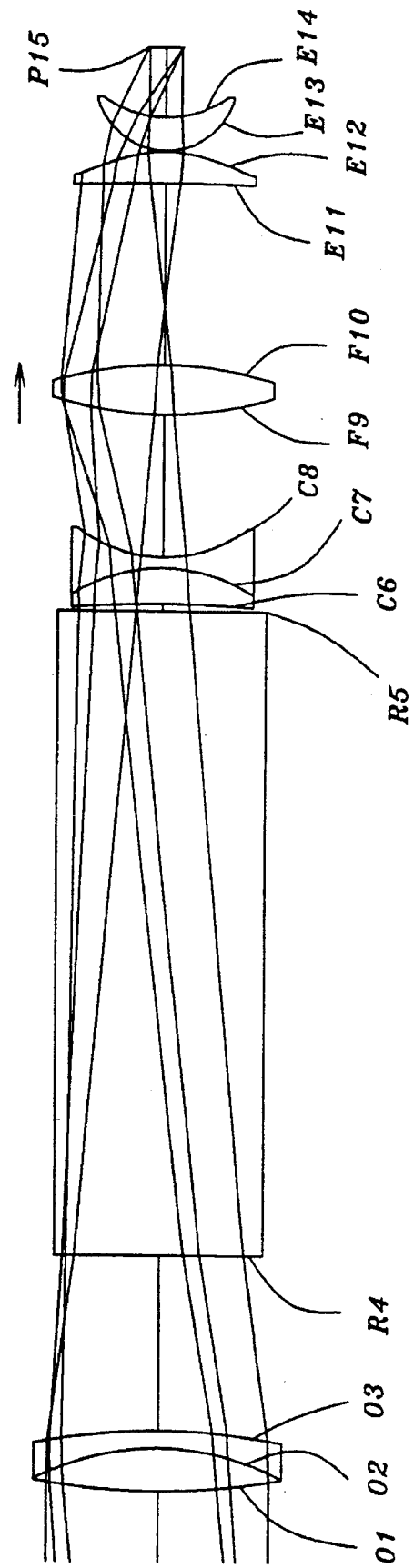
Figure 3:
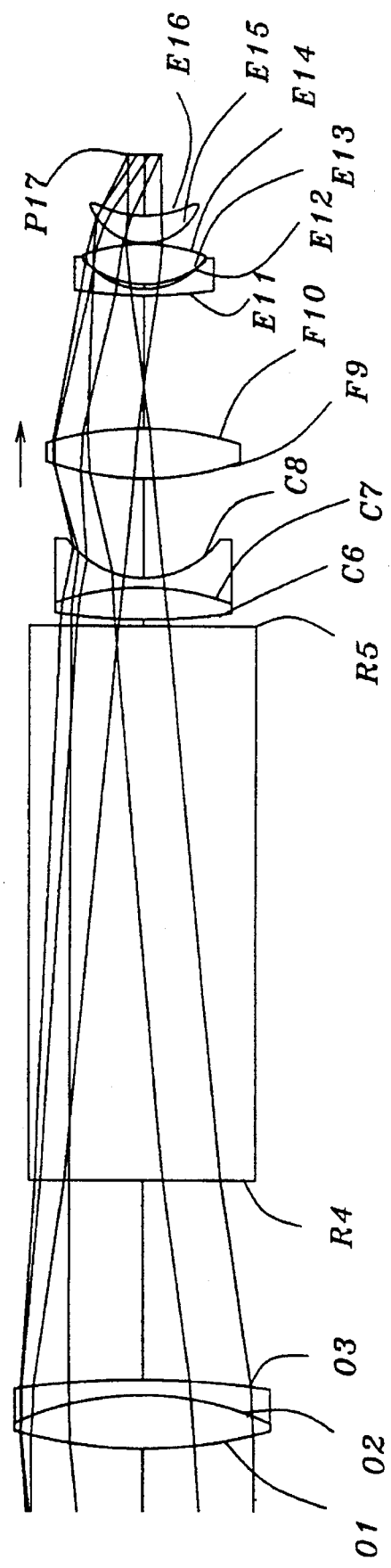
Figure 4:
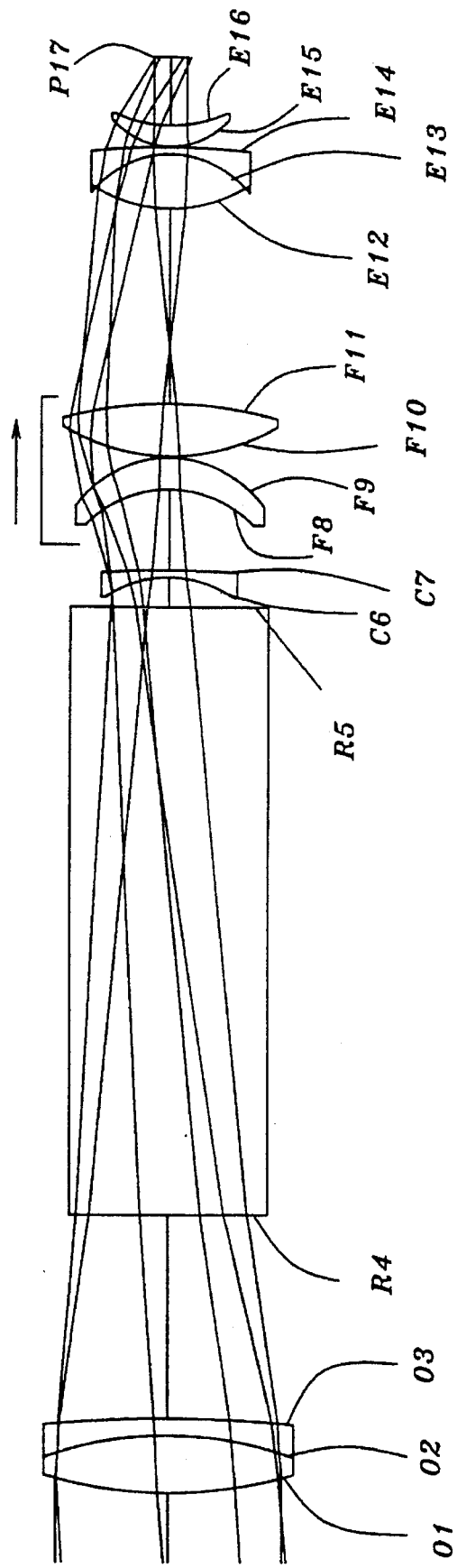
Figure 5:
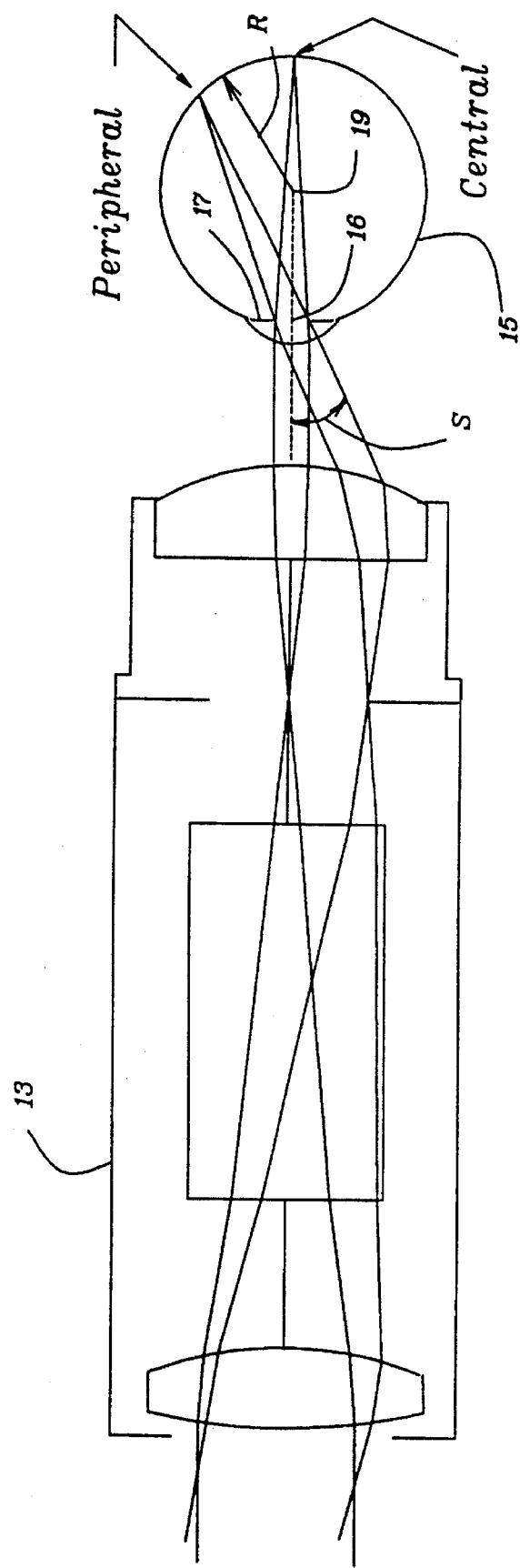
FIGS. 5 through 8 are schematic diagrams relating to the definitions of S and D, respectively.
Figure 6:
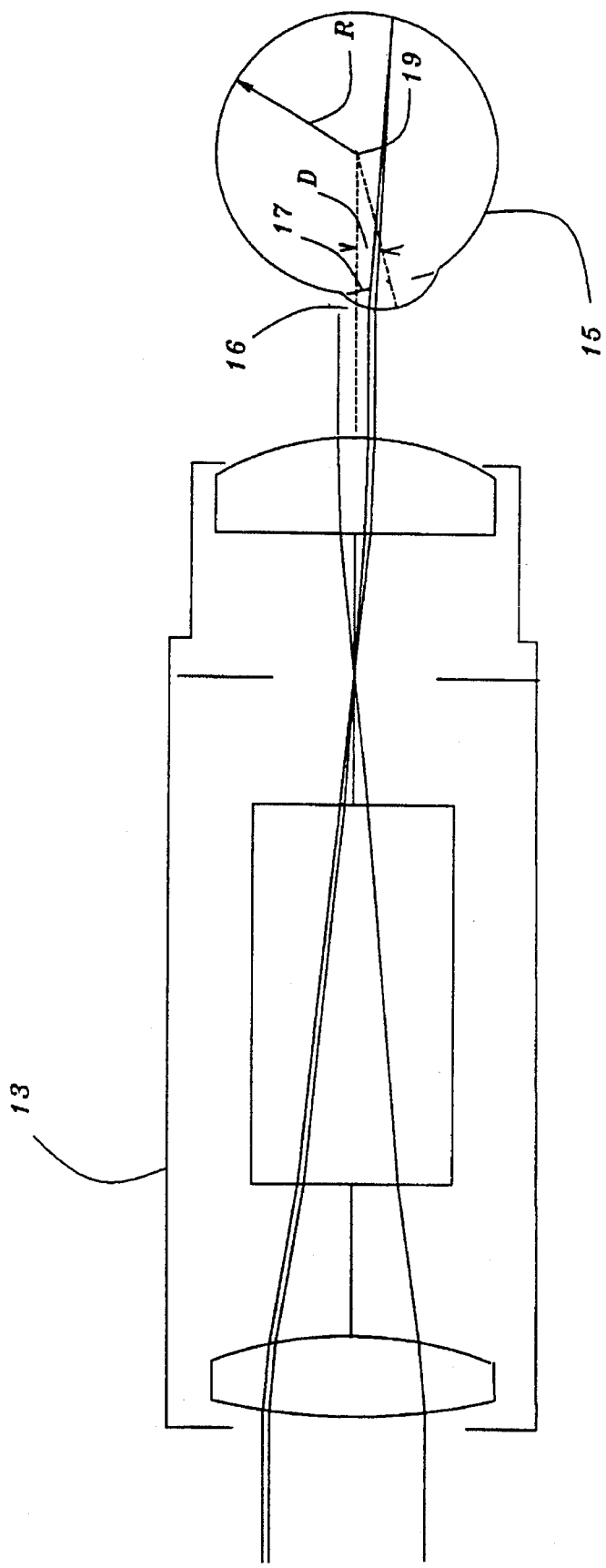
Figure 8:
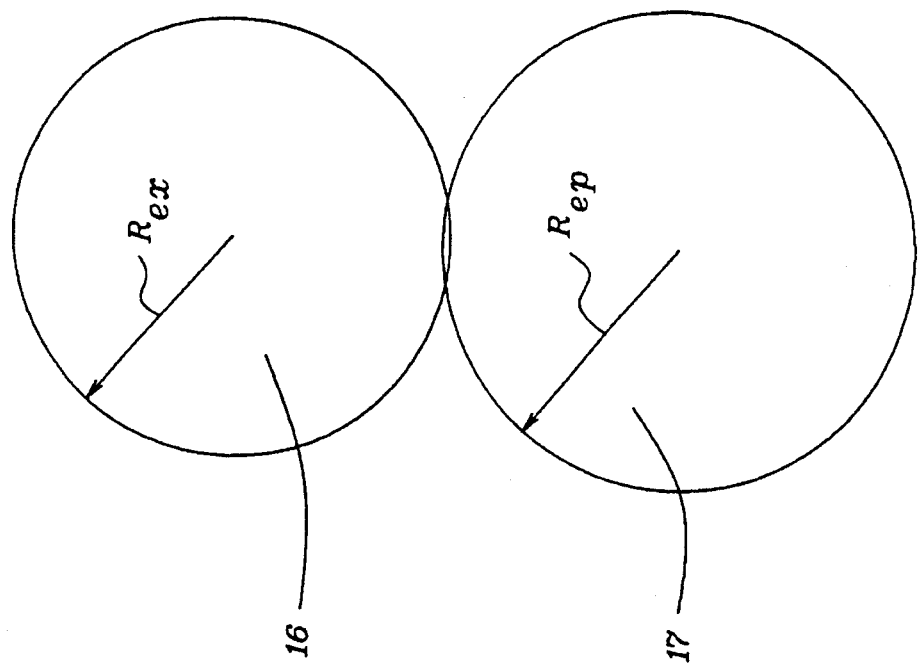
Figure 7:
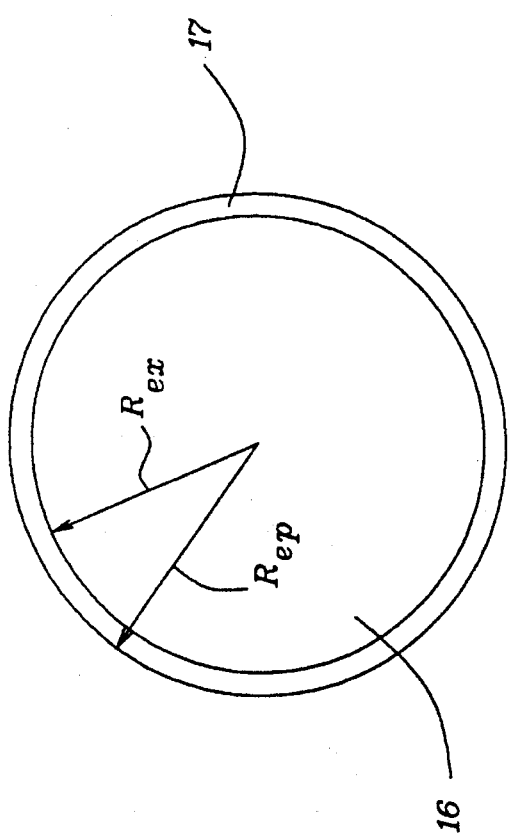

Without intending to limit it in any manner, the present invention will be more fully described by the following Examples 1–4. FIGS. 1–4 and Tables 1–4 correspond to these examples. The glasses and plastics referred to in Tables 1–4 are set forth in Table 5, where the glass names are the SCHOTT designations. Equivalent glasses made by other manufacturers can be used in the practice of the invention. The aspheric coefficients set forth in Tables 1–4 are for use in the following equation:

$$z = \frac{cy^2}{1+[1-(1+k)c^2y^2]^{1/2}} + ADy^4 + AEy^6 + AFy^8 + AGy^{10} + AHy^{12} + AIy^{14}$$

where z is the surface sag at a distance y from the optical axis of the system, c is the curvature of the lens at the optical axis, and k is a conic constant.

The abbreviations used in the tables are as follows: SN—surface number; CLR. AP.—clear aperture; and ZP—zoom (magnification) position. All dimensions given in the tables are in millimeters.

EXAMPLE 1

This example illustrates a binocular construction in accordance with the invention having a single magnification and a S/D ratio greater than 3.0.

The binoculars operate at a magnifying power of 12×. As in all of the examples, the first lens unit is a conventional objective, although having a shorter focal length than the combined focal length of the first and second units so as to reduce the aperture and hence size of the reverting and inverting system. The second unit is a negative doublet, providing aberration correction and the desired shorter focal length for the first lens unit. To provide a large aided static field of view, two aspheric surfaces are employed in the eye lens unit. A glass element is used nearest the eye to provide durability.

EXAMPLE 2

This example illustrates a binocular construction in accordance with the invention having two magnifications and a S/D ratio above 3.0 for its high magnification configuration. It also illustrates the ability of the invention to simplify the construction of the binoculars and thus minimize cost.

The lens system of this example has the same number of lens elements as the lens system of Example 1, but utilizes a moving field lens to provide the magnification change.

EXAMPLE 3

Example 3 has a similar construction to Example 2, except a doublet is included in the eye lens unit for aberration correction. Variable power is again provided by moving a single element field lens unit.

EXAMPLE 4

Example 4 is similar to Examples 2 and 3 except that no aspherical elements are included, and only a single negative element is used for the second unit. A doublet element is added in the eye lens unit for aberration correction as in Example 3, and the field lens unit has two positive elements.

Tables 7 and 8 summarize various of the properties of the lens systems of Examples 1–4. In particular, Table 7 sets forth their S/D ratios and the various quantities used to calculate these ratios. Table 8 sets forth the focal lengths of the objective lens unit ($f_a$), the corrector lens unit ($f_b$), their combination ($f_{ab}$), and the combined focal length of the field lens unit and the eye lens unit ($f_{fe}$). Among other things, it should be noted in this table that $f_a$ is considerably smaller than $f_{ab}$, i.e., $f_a$ is less than about 0.75 of $f_{ab}$. As discussed above, this leads to various practical advantages including smaller reverting and inverting means and smaller overall size of the binoculars.

Although specific embodiments of the invention have been described and illustrated, it is to be understood that modifications can be made without departing from the invention's spirit and scope. For example, the binoculars of the invention will normally include means for moving the objective lens unit and the eye lens unit relative to one another for overall focusing and means for moving one or more elements of the eye lens unit of one side of the binoculars for relative focusing between the two eyes. Automatic focusing systems can also be used if desired.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

| | LENS SYSTEM PRESCRIPTION | | | |
|---|---|---|---|---|
| SN | RADIUS | THICKNESS | MATERIAL | CLR. AP. |
| 1 | 88.6136 | 6.00000 | BK7 | 36.2 |
| 2 | −44.5396 | 2.45000 | SF2 | 36.1 |
| 3 | −110.6635 | 26.09697 | | 35.4 |
| 4 | ∞ | 92.00000 | BK7 | 26.3 |
| 5 | ∞ | 1.00000 | | 16.5 |
| 6 | −122.2245 | 5.00000 | SF6 | 16.5 |
| 7 | −20.2152 | 1.50000 | FK5 | 16.7 |
| 8 | 18.7242 | 39.97262 | | 16.4 |
| 9 | 158.5377 | 7.00000 | 715537 | 36.6 |
| 10 | −35.4812 | 3.11732 | | 36.7 |
| 11 | −114.4544 | 5.00000 | ACRYLIC | 31.8 |
| 12 | −18.6258 | 0.10000 | | 31.1 |
| 13 | 13.5177 | 6.00000 | BK7 | 22.9 |
| 14 | 34.4993 | 11.00000 | | 21.1 |

TABLE 1-continued

| | | | | | | |
|---|---|---|---|---|---|---|
| 15 | pupil | 0.00000 | | | 3.0 | |

| ASPHERICAL SURFACE DATA | | | | | | | |
|---|---|---|---|---|---|---|---|
| SN | AD | AE | AF | AG | AH | AI | k |
| 9 | 1.3264E-06 | 9.8519E-10 | -1.5393E-13 | 8.5736E-16 | 2.5087E-17 | 1.5888E-19 | 0.0 |
| 12 | 5.0531E-05 | 7.2118E-08 | -8.3705E-10 | -2.8920E-12 | 3.1293E-14 | -5.3833E-17 | -1.0 |

TABLE 2

| LENS SYSTEM PRESCRIPTION | | | | |
|---|---|---|---|---|
| SN | RADIUS | THICKNESS | MATERIAL | CLR. AP. |
| 1 | 100.1433 | 6.00000 | BK7 | 33.1 |
| 2 | -39.1400 | 2.45000 | SF2 | 33.1 |
| 3 | -93.7651 | 24.93315 | | 33.1 |
| 4 | ∞ | 92.00000 | BK7 | 27.4 |
| 5 | ∞ | 1.00000 | | 24.0 |
| 6 | -171.6049 | 5.00000 | SF6 | 24.0 |
| 7 | -24.8945 | 1.50000 | FK5 | 24.1 |
| 8 | 21.2647 | zoom | | 22.6 |
| 9 | 54.8495 | 7.00000 | LAK8 | 29.7 |
| 10 | -54.8495 | zoom | | 29.8 |
| 11 | -313.1092 | 4.50000 | ACRYLIC | 23.5 |
| 12 | -17.5737 | 0.10000 | | 23.3 |
| 13 | 10.4116 | 4.69390 | BK7 | 18.1 |
| 14 | 15.9230 | 10.00000 | | 16.0 |
| 15 | pupil | 0.00000 | | 4.7 |

| ASPHERICAL SURFACE DATA | | | | | | | |
|---|---|---|---|---|---|---|---|
| SN | AD | AE | AF | AG | AH | AI | k |
| 12 | 7.9444E-05 | -2.4831E-07 | -9.1815E-10 | 4.6797E-12 | 6.0963E-14 | -2.6363E-16 | -1.0 |

| ZOOM SPACINGS | | |
|---|---|---|
| ZP/SN | 8 | 10 |
| 1 | 20.04 | 25.74 |
| 2 | 42.44 | 3.38 |

TABLE 3

| LENS SYSTEM PRESCRIPTION | | | | |
|---|---|---|---|---|
| SN | RADIUS | THICKNESS | MATERIAL | CLR. AP. |
| 1 | 78.9704 | 8.34000 | BK7 | 38.7 |
| 2 | -50.6434 | 2.45000 | SF2 | 38.5 |
| 3 | -149.8664 | 31.91837 | | 38.4 |
| 4 | ∞ | 88.00000 | BK7 | 31.9 |
| 5 | ∞ | 1.00000 | | 24.4 |
| 6 | 101.5039 | 5.00000 | SF6 | 24.2 |
| 7 | -41.8477 | 1.50000 | FK5 | 23.8 |
| 8 | 15.6974 | zoom | | 21.2 |
| 9 | 47.0792 | 8.00000 | LAK8 | 26.1 |
| 10 | -52.5059 | zoom | | 26.2 |
| 11 | 79.2734 | 1.00000 | FK5 | 20.9 |
| 12 | 12.8147 | 0.75816 | | 19.3 |
| 13 | 15.5741 | 6.19112 | ACRYLIC | 18.9 |
| 14 | -23.5443 | 0.10000 | | 18.8 |
| 15 | 9.5127 | 4.36739 | BK7 | 16.0 |
| 16 | 17.2584 | 10.00000 | | 14.4 |
| 17 | pupil | 0.00000 | | 5.5 |

TABLE 3-continued

ASPHERICAL SURFACE DATA

| SN | AD | AE | AF | AG | AH | AI | k |
|---|---|---|---|---|---|---|---|
| 14 | 7.6858E-05 | 1.3190E-07 | −1.2475E-08 | 7.0056E-11 | 7.8654E-13 | −7.5457E-15 | 0.0 |

ZOOM SPACINGS

| ZP/SN | 8 | 10 |
|---|---|---|
| 1 | 15.435 | 20.897 |
| 2 | 36.128 | 0.246 |

TABLE 4

LENS SYSTEM PRESCRIPTION

| SN | RADIUS | THICKNESS | MATERIAL | CLR. AP. |
|---|---|---|---|---|
| 1 | 67.3956 | 8.34000 | BK7 | 35.5 |
| 2 | −57.3699 | 2.45000 | SF2 | 35.0 |
| 3 | −192.1898 | 29.61977 | | 34.7 |
| 4 | ∞ | 88.00000 | BK7 | 27.8 |
| 5 | ∞ | 4.30000 | | 18.5 |
| 6 | −17.6770 | 1.00000 | FK5 | 18.3 |
| 7 | −142.7945 | zoom | | 19.4 |
| 8 | −17.6578 | 4.61585 | F2 | 23.2 |
| 9 | −17.5431 | 0.20000 | | 26.3 |
| 10 | 32.6313 | 7.50000 | BK7 | 30.2 |
| 11 | −62.1867 | zoom | | 29.9 |
| 12 | 21.7839 | 8.00000 | PCD2 | 21.7 |
| 13 | −15.3201 | 1.00000 | SF2 | 21.3 |
| 14 | −111.9591 | 0.10000 | | 19.6 |
| 15 | 12.0718 | 3.00000 | BK7 | 16.7 |
| 16 | 21.4030 | 10.00000 | | 15.5 |
| 17 | pupil | 0.00000 | | 4.8 |

ZOOM SPACINGS

| ZP/SN | 7 | 11 |
|---|---|---|
| 1 | 11.637 | 28.247 |
| 2 | 30.708 | 9.179 |

TABLE 5

| MATERIAL | $N_e$ | $V_e$ |
|---|---|---|
| BK7 | 1.51872 | 64.0 |
| ACRYLIC | 1.49353 | 57.3 |
| LAK8 | 1.71615 | 53.6 |
| FK5 | 1.48914 | 70.2 |
| SF6 | 1.81264 | 25.2 |
| SF2 | 1.65221 | 33.6 |
| PCD2 | 1.57087 | 62.9 |
| 715537 | 1.71500 | 53.7 |
| F2 | 1.62408 | 36.1 |

TABLE 6

| $R_{ex}$ | D |
|---|---|
| 1.5 | 13° |
| 2.0 | 15° |
| 2.5 | 17° |
| 3.0 | 19° |
| 3.5 | 21° |
| 4.0 | 23° |
| 4.5 | 24.8° |
| 5.0 | 26.6° |

TABLE 7

| Ex. | Mag. | $R_{en}$ | $R_{ex}$ | $U_o$ | S | D | S/D |
|---|---|---|---|---|---|---|---|
| 1 | 12 | 17.5 | 1.46 | 4.6 | 55.2 | 12.8 | 4.31 |
| 2 | 6.85 | 16 | 2.34 | 5.0 | 34.2 | 16.5 | 2.07 |
|   | 12 | 16 | 1.33 | 3.4 | 40.8 | 12.3 | 3.32 |
| 3 | 6.79 | 18 | 2.65 | 5.0 | 34.0 | 17.7 | 1.92 |
|   | 12 | 18 | 1.50 | 3.2 | 38.4 | 13.0 | 2.95 |
| 4 | 6.9 | 17 | 2.46 | 5.0 | 34.5 | 16.9 | 2.04 |
|   | 12 | 17 | 1.42 | 3.2 | 38.4 | 12.7 | 3.02 |

Mag. is the magnifying power.
$R_{en}$ is the entrance pupil radius in mm.
$R_{ex}$ is the exit pupil radius in mm.
$U_o$ is the semi "field of view" in object space in degrees.
S is the product of Mag. and $U_o$.
D is calculated using equation 1.

TABLE 8

| Ex. | $f_{ab}$ | $f_a$ | $f_b$ | $f_{fe}$ |
|---|---|---|---|---|
| 1 | 180.1 | 115.5 | −59.9 | 15.0 |
| 2 | 175.8 | 115.8 | −68.1 | 25.7 |
|   |   |   |   | 14.6 |
| 3 | 169.4 | 122.0 | −69.4 | 24.9 |
|   |   |   |   | 14.1 |
| 4 | 199.5 | 115.1 | −41.3 | 29.0 |
|   |   |   |   | 16.6 |

$f_{ab}$ is the combined focal length of the objective lens unit and the corrector lens unit.
$f_a$ is the focal length of the objective lens unit.
$f_b$ is the focal length of the corrector lens unit.
$f_{fe}$ is the combined focal length of the field lens unit and eye lens unit.

What is claimed is:

1. An objective for use in a viewing system of the monocular or binocular type which forms an image of an object, said objective forming an intermediate image of the object and comprising in order from the object end of the viewing system:

(a) a positive lens unit, (b) reverting and inverting means for causing the intermediate image when formed to be reverted and inverted, and (c) a fixed negative lens unit before the intermediate image.

2. The objective of claim 1 wherein (i) the positive lens unit has a focal length; (ii) the positive lens unit and the negative lens unit have a combined focal length; and (iii) the ratio of the focal length of the positive lens unit to the combined focal length of the positive lens unit and the negative lens unit is less than about 0.75.

* * * * *